Patented June 19, 1928.

1,674,122

UNITED STATES PATENT OFFICE.

DONALD H. POWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF ACCELERATING RUBBER VULCANIZATION AND PRODUCT THEREOF.

No Drawing.   Application filed July 28, 1926. Serial No. 125,598.

This invention relates to the vulcanization of rubber in the presence of certain organic accelerators and to the rubber product resulting therefrom.

It is well known that the salts of alkyl xanthogenic acids and their oxidation products, the oxythiocarbonic disulphides are rather active accelerators of vulcanization. However, their use requires special care, for vulcanization at temperatures as low as 70° C. has been obtained. This tendency to pre-vulcanize or "scorch" limits very greatly the use of the xanthogenates and their oxidation products.

It is an object of this invention to provide a new vulcanizing process based on the use of substances prepared from relatively cheap intermediates and which show less tendency to prevulcanize than the classes of compounds mentioned above. It is another object of this invention to provide a new vulcanizing process that can be conducted at temperatures below 250° F., thus making it possible to obtain rubber stocks of high physical properties, inasmuch as it is not necessary to heat the rubber to the usual high temperatures to effect vulcanization.

The new compositions of matter that I have found to be particularly valuable as accelerators for the vulcanization of rubber or rubber-like substances may be prepared in the following manner:—

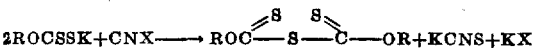

where R = an alkyl group or substituted alkyl
X = a halogen radical.

The new compositions formed have been called "O—alkyl thiocarbonic monosulphides".

A preferred method of preparing them is as follows:

One hundred and seventy pounds of sodium butyl xanthogenate are dissolved in five hundred pounds of water. Fifty-three pounds of cyanogen bromide are melted and slowly run into the cooled, agitated water solution of sodium butyl xanthogenate. The reaction is almost instantaneous and 0.5 hour after all of the cyanogen bromide has been run into the solution the oxybutylthiocarbonic monosulphide is separated, washed and dried. This product is stable and may be stored indefinitely without danger of decomposition.

Another method of preparing one of these new compositions of matter is as follows:

One hundred and sixty pounds of potassium ethyl xanthogenate is dissolved in water and thirty pounds of cyanogen chloride in the vapor phase is bubbled through the cold solution of the xanthogenate.

When the addition of the cyanogen chloride is complete the oxy ethyl thiocarbonic monosulphide is collected on a filter press, washed and dried.

It has been found that the oxy alkyl thio carbonic monosulphides are still more effective accelerators of vulcanization in the presence of ammonia or amines. In a stock containing one hundred parts of rubber, three parts of sulfur, three parts of zinc oxide, and three parts of oxy ethyl thio carbonic monosulphide, a cure was obtained at 100° C. at the end of ninety minutes. When the same stock was used and one part of aniline was added a good cure was obtained in an hour.

It is understood that I do not wish to be limited to the process herein outlined nor to the cases mentioned, for it will be obvious to those skilled in the art that it is not so limited but that various modifications and changes may be made therein, without departing from the spirit of the invention or from the scope of the appended claims.

I claim:

1. A process for accelerating the vulcanizing of rubber which comprises vulcanizing the same in the presence of a material embodying the following organic structure:

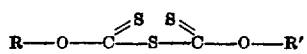

where R and R' represent an alkyl group.

2. A process for accelerating the vulcanization of rubber which comprises vulcanizing the same in the presence of a thio carbonic monosulphide derivative.

3. A process for treating rubber which comprises subjecting the rubber to a vulcanizing agent, an amine and a material embodying the following organic structure:

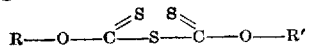

where R and R' represent an alkyl group.

4. A process for treating rubber which comprises subjecting the rubber to a vulcanizing agent, an amine and a derivative of thio carbonic monosulphide.

5. A process for treating rubber which comprises subjecting the rubber to a vulcanizing agent and the product obtained by the interaction of a salt of an alkyl xanthogenate with a cyanogen halide.

6. A process for accelerating the vulcanization of rubber which comprises vulcanizing the same in the presence of oxy ethyl thio carbonic monosulphide.

7. A process for treating rubber which comprises subjecting the rubber to a vulcanizing agent, an amine, and oxy ethyl thio carbonic monosulphide.

8. A process for accelerating the vulcanization of rubber which comprises vulcanizing the same in the presence of oxy butyl thio carbonic monosulphide.

9. A process for treating rubber which comprises subjecting the rubber to a vulcanizing agent, an amine, and oxy butyl thio carbonic monosulphide.

10. A rubber product which has been vulcanized in the presence of a material embodying the following organic structure:

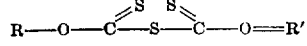

which R and R' represent alkyl or substituted alkyl groups.

11. A rubber product which has been vulcanized in the presence of a thio carbonic monosulphide derivative.

12. A rubber product which has been vulcanized in the presence of a vulcanizing agent, an amine and a material embodying the following organic structure:

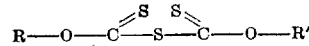

where R and R' represent an alkyl or substituted alkyl group.

13. A rubber product which has been vulcanized in the presence of a vulcanizing agent, an amine, and a derivative of thio carbonic monosulphide.

14. A rubber product which has been vulcanized in the presence of the product obtained by the interaction of a salt of an alkyl xanthogenate with a cyanogen halide.

15. A rubber product which has been vulcanized in the presence of oxy ethyl thio carbonic monosulphide.

16. A rubber product which has been vulcanized in the presence of a vulcanizing agent, an amine, and oxy ethyl thio carbonic monosulphide.

17. A rubber product which has been vulcanized in the presence of oxy butyl thio carbonic monosulphide.

18. A rubber product which has been vulcanized in the presence of a vulcanizing agent, an amine, and oxy butyl thio carbonic monosulphide.

In testimony whereof I affix my signature.

DONALD H. POWERS.

---

CERTIFICATE OF CORRECTION.

Patent No. 1,674,122.  Granted June 19, 1928, to

DONALD H. POWERS.

It is hereby certified that error appears in the printed specification of the above numbered patent requiring correction as follows: Page 2, lines 33 and 34, claim 10, in the formula, strike out the double bond between the "O and R" and insert instead a single bond; and that the said Letters Patent should be read with this correction therein that the same may conform to the record of the case in the Patent Office.

Signed and sealed this 31st day of July, A. D. 1928.

(Seal)

M. J. Moore,
Acting Commissioner of Patents.

embodying the following organic structure:

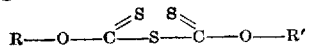

where R and R' represent an alkyl group.

4. A process for treating rubber which comprises subjecting the rubber to a vulcanizing agent, an amine and a derivative of thio carbonic monosulphide.

5. A process for treating rubber which comprises subjecting the rubber to a vulcanizing agent and the product obtained by the interaction of a salt of an alkyl xanthogenate with a cyanogen halide.

6. A process for accelerating the vulcanization of rubber which comprises vulcanizing the same in the presence of oxy ethyl thio carbonic monosulphide.

7. A process for treating rubber which comprises subjecting the rubber to a vulcanizing agent, an amine, and oxy ethyl thio carbonic monosulphide.

8. A process for accelerating the vulcanization of rubber which comprises vulcanizing the same in the presence of oxy butyl thio carbonic monosulphide.

9. A process for treating rubber which comprises subjecting the rubber to a vulcanizing agent, an amine, and oxy butyl thio carbonic monosulphide.

10. A rubber product which has been vulcanized in the presence of a material embodying the following organic structure:

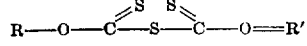

which R and R' represent alkyl or substituted alkyl groups.

11. A rubber product which has been vulcanized in the presence of a thio carbonic monosulphide derivative.

12. A rubber product which has been vulcanized in the presence of a vulcanizing agent, an amine and a material embodying the following organic structure:

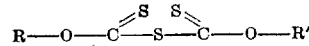

where R and R' represent an alkyl or substituted alkyl group.

13. A rubber product which has been vulcanized in the presence of a vulcanizing agent, an amine, and a derivative of thio carbonic monosulphide.

14. A rubber product which has been vulcanized in the presence of the product obtained by the interaction of a salt of an alkyl xanthogenate with a cyanogen halide.

15. A rubber product which has been vulcanized in the presence of oxy ethyl thio carbonic monosulphide.

16. A rubber product which has been vulcanized in the presence of a vulcanizing agent, an amine, and oxy ethyl thio carbonic monosulphide.

17. A rubber product which has been vulcanized in the presence of oxy butyl thio carbonic monosulphide.

18. A rubber product which has been vulcanized in the presence of a vulcanizing agent, an amine, and oxy butyl thio carbonic monosulphide.

In testimony whereof I affix my signature.

DONALD H. POWERS.

---

CERTIFICATE OF CORRECTION.

Patent No. 1,674,122.    Granted June 19, 1928, to

DONALD H. POWERS.

It is hereby certified that error appears in the printed specification of the above numbered patent requiring correction as follows: Page 2, lines 33 and 34, claim 10, in the formula, strike out the double bond between the "O and R" and insert instead a single bond; and that the said Letters Patent should be read with this correction therein that the same may conform to the record of the case in the Patent Office.

Signed and sealed this 31st day of July, A. D. 1928.

(Seal)

M. J. Moore,
Acting Commissioner of Patents.